United States Patent [19]

Aomori et al.

[11] Patent Number: 5,625,474
[45] Date of Patent: Apr. 29, 1997

[54] FULL-COLOR LIQUID CRYSTAL DISPLAY DEVICE AND FABRICATION PROCESS THEREFOR

[75] Inventors: Shigeru Aomori; Atsushi Tanaka; Seiichi Mitsui, all of Chiba-ken, Japan

[73] Assignee: Sharp Kabushiki Kaisha, Osaka, Japan

[21] Appl. No.: 658,891

[22] Filed: May 31, 1996

[30] Foreign Application Priority Data

Jun. 2, 1995 [JP] Japan ................... 7-136956

[51] Int. Cl.⁶ .................. G02F 1/133; G02F 1/1343
[52] U.S. Cl. .................. 349/79; 349/139
[58] Field of Search ............... 359/59, 53, 87, 359/60

[56] References Cited

U.S. PATENT DOCUMENTS

| | | | |
|---|---|---|---|
| 4,878,741 | 11/1989 | Fergason | 359/53 |
| 5,015,074 | 5/1991 | Clerc et al. | 395/53 |
| 5,032,007 | 7/1991 | Silverstein et al. | 359/53 |
| 5,386,307 | 1/1995 | Jang | 359/53 |
| 5,414,545 | 5/1995 | Lee | 359/53 |
| 5,450,222 | 9/1995 | Sirkin | 359/53 |

FOREIGN PATENT DOCUMENTS

| | | | |
|---|---|---|---|
| 56-35168 | of 1981 | Japan . | |
| 60-173520 | of 1985 | Japan . | |
| 60-6925 | 1/1985 | Japan | 359/53 |
| 61-134789 | of 1986 | Japan . | |
| 3-238424 | of 1991 | Japan . | |
| 6-75238 | of 1994 | Japan . | |
| 86/05282 | 9/1986 | WIPO | 359/53 |

OTHER PUBLICATIONS

204 Japan Display '83; Color IcdS: Technological Developments by Tatsuo Uchida 1983.
IBM Technical Disclosure Bulletin, vol. 28, No. 2 "Crossed Guest-Host Liquid" Jul. 1985.
Crystal Display Employing Anisotropic Conductor Plate.

Primary Examiner—William L. Sikes
Assistant Examiner—Tiep H. Nguyen
Attorney, Agent, or Firm—David G. Conlin; George W. Neuner

[57] ABSTRACT

A full-color liquid crystal display device is provided which includes: a first substrate formed with a plurality of liquid crystal driving active elements; and first, second and third liquid crystal cells stacked one on another on an inter-layer film formed on the first substrate; the first liquid crystal cell including a first liquid crystal driving electrode connected to a first liquid crystal driving active element formed on the first substrate; the second liquid crystal cell formed on the second substrate and including a second liquid crystal driving electrode connected to a second liquid crystal driving active element formed on the first substrate via a lower stereo-interconnection extending through the first liquid crystal cell; the third liquid crystal cell formed on the third substrate and including a third liquid crystal driving electrode connected to a third liquid crystal driving active element formed on the first substrate via another lower stereo-interconnection extending through the first liquid crystal cell and an upper stereo-interconnection extending through the second liquid crystal cell.

10 Claims, 9 Drawing Sheets absorbing whole light component in the Off-state absorbing whole light component in the On-state

FULL-COLOR LIQUID CRYSTAL DISPLAY DEVICE AND FABRICATION PROCESS THEREFOR

BACKGROUND OF THE INVENTION

1. Field of the Invention

The present invention relates to a full-color liquid crystal display device and a fabrication process therefor. More particularly, the invention relates to a full-color liquid crystal display device suitable for OA (office automation) systems such as word-processor, notebook personal computer and portable information terminal, various visual systems, game systems and the like, and to a fabrication process therefor.

2. Description of Related Arts

In recent years, rapid developments have been made in applications of liquid crystal display devices to word-processors, notebook type personal computers, portable information terminals, portable TVs and the like. Transmissive liquid crystal display elements such as of twisted nematic (TN) type and super-twisted nematic (STN) type are conventionally used for the liquid crystal display devices.

The TN-type liquid crystal display elements, which are disposed between a pair of polarizers, achieve monochromic display by utilizing optical characteristics for illumination from a back light disposed behind the display elements. More specifically, the TN-type liquid crystal display elements utilize optical switching characteristics attributable to the optical rotation of a liquid crystal which emerges with no voltage being applied and is negated with a voltage being applied. For color display, each pixel is divided into three sub-elements which are respectively provided with red-, green- and blue-color filters each having minute dimensions. By utilizing the aforesaid optical switching characteristics, multi-color or full-color display is achieved by way of the additive color process. At present, this principle is widely used in color liquid crystal display devices driven by active-matrix addressing or simple-matrix addressing.

Liquid crystal display devices utilizing the additive color process for color display, however, suffer from a low use efficiency of light (typically, several percent), thereby requiring a high-power back light. This is because the pixels thereof, which are each divided into three sub-elements respectively provided with red-, green- and blue- color filters, can utilize only one third the illumination passing through the liquid crystal layers thereof. Where such a liquid crystal display device is employed in a portable information terminal, a portable TV or a like system, power consumed by the back light accounts for the majority of the overall power consumption of the system. Therefore, the liquid crystal display device cannot enjoy the advantage of low power consumption of the liquid crystal display elements.

From the view point of energy saving and life-time extension of the portable information terminal or a like system, it is indispensable for the liquid crystal display devices to satisfy the low-power-consumption requirements.

To overcome this drawback, there are proposed a reflective liquid crystal display device employing no back light and a display method offering an improved use efficiency of light.

The reflective liquid crystal display device is disclosed in "Next-Generation Liquid Crystal Display Technology", pp. 167–196 (authored by Tatsuo Uchida and published by Kogyo Chosakai) of Japan. The reflective liquid crystal display device is adapted for full-color display, and has three liquid crystal panels respectively including liquid crystal layers containing cyan, magenta and yellow dyes and stacked one on another. These liquid crystal panels are independently driven to achieve full-color display by way of the subtractive color process.

According to the color display method by the subtractive color process, each pixel can utilize all illumination passing through the liquid crystal layers to produce multiple colors for full-color display. Therefore, the use efficiency of light is increased three times that of the full-color display method utilizing the additive color process.

However, the reflective liquid crystal display device suffers from color offset when viewed on the skew. This is because transparent glass substrates are disposed between the respective liquid crystal layers. Therefore, it is necessary to sufficiently reduce the thickness of the substrate relative to the size of each pixel. On the other hand, to independently drive the respective liquid crystal panels, a liquid crystal driving active element should be formed in each of the liquid crystal panels. Therefore, the substrates are required to have higher strength and heat-resistance. Where thin plastic plates are to be used as the substrates, for example, low strength and heat-resistance of the thin plastic plates may pose a difficult problem during a process for fabricating the liquid crystal panels. Further, the liquid crystal panels each require to be formed with a liquid crystal driving active element and a driver circuit, so that the fabrication of the reflective liquid crystal display device requires a complicated and expensive process.

The method for improving the use efficiency of light involves stacking of liquid crystal layers. Japanese Unexamined Patent Publications No. Sho 60(1985)-173520 and No. Sho 61(1986)-134789, for example, disclose guest-host liquid crystal cells having two liquid crystal layers disposed between three substrates. The two liquid crystal layers are driven by an active element formed on one of the three substrates. According to this method, the two guest-host liquid crystal layers are stacked such that the alignment of liquid crystal molecules in one liquid crystal layer is perpendicular to that in the other liquid crystal layer and, therefore, all the light components of natural light can be efficiently utilized.

However, the driving of the two liquid crystal layers is enabled by the single active element, making it impossible to independently drive the respective liquid crystal layers. Therefore, the liquid crystal cells cannot utilize the subtractive color process but the additive color process for color display. This offsets the advantage of full utilization of natural light.

SUMMARY OF THE INVENTION

In accordance with one aspect of the present invention, there is provided a full-color liquid crystal display device comprising: a plurality of liquid crystal driving active elements formed on a first substrate; and first, second and third liquid crystal cells stacked one on another on an inter-layer film formed on the first substrate; the first liquid crystal cell including a first liquid crystal driving electrode connected to a first liquid crystal driving active element formed on the first substrate, a first counter electrode facing opposite the first liquid crystal driving electrode, a second substrate having the first counter electrode formed on an lower surface thereof, and a first liquid crystal layer sandwiched between the first liquid crystal driving electrode and the first counter electrode; the second liquid crystal cell formed on the second substrate and including a second liquid crystal driving electrode connected to a second liquid crystal driving active element formed on the first substrate via a stereo-interconnection extending through the first liquid crystal cell, a second counter electrode facing opposite the second liquid crystal driving electrode, a third substrate having the second counter electrode formed on a lower surface thereof, and a second liquid crystal layer sandwiched between the second liquid crystal driving electrode and the second counter electrode; the third liquid crystal cell formed on the third substrate and including a third liquid crystal driving electrode connected to a third liquid crystal driving active element formed on the first substrate via another stereo-interconnection extending through the first liquid crystal cell and the second liquid crystal cell, a third counter electrode facing opposite the third liquid crystal driving electrode, a fourth substrate having the third counter electrode formed on a lower surface thereof, and a third liquid crystal layer sandwiched between the third liquid crystal driving electrode and the third counter electrode.

In accordance with another aspect of the present invention, there is provided a process for fabricating a full-color liquid crystal display device, comprising the steps of: (i) forming a plurality of liquid crystal driving active elements on a first substrate, and forming an inter-layer film on the entire surface of the first substrate including the liquid crystal driving active elements, the inter-layer film having a plurality of contact holes extending therethrough to the liquid crystal driving active elements; (ii) forming on the inter-layer film a first liquid crystal driving electrode connected to a first liquid crystal driving active element and electrode pads respectively connected to second and third liquid crystal driving active elements, and forming lower stereo-interconnection layers respectively connected to the electrode pads formed on the inter-layer film; (iii) forming electrode pads and a first counter electrode on one surface of a second substrate, and bonding the second substrate to the first substrate in such a manner that the first counter electrode and the first liquid crystal driving electrode face opposite to each other to define a desired space therebetween; (iv) forming on the other surface of the second substrate an electrode pad and a second liquid crystal driving electrode connected to one of the lower stereo-interconnection layers, and forming an upper stereo-interconnection layer connected to the electrode pad formed on the other surface of the second substrate; (v) forming a second counter electrode and an electrode pad on one surface of a third substrate, and bonding the third substrate to the second substrate in such a manner that the second counter electrode and the second liquid crystal driving electrode face opposite to each other to define a desired space therebetween; (vi) forming on the other surface of the third substrate a third liquid crystal driving electrode connected to the upper stereo-interconnection layer; (vii) forming a third counter electrode on a surface of a fourth substrate, and bonding the fourth substrate to the third substrate in such a manner that the third counter electrode and the third liquid crystal driving electrode face opposite to each other to define a desired space therebetween; and (viii) filling liquid crystal compositions into the spaces respectively defined between the first counter electrode and the first liquid crystal driving electrode, between the second counter electrode and the second liquid crystal driving electrode and between the third counter electrode and the third liquid crystal driving electrode to form first, second and third liquid crystal layers, respectively.

DETAILED DESCRIPTION OF THE PREFERRED EMBODIMENTS

Figure 1:
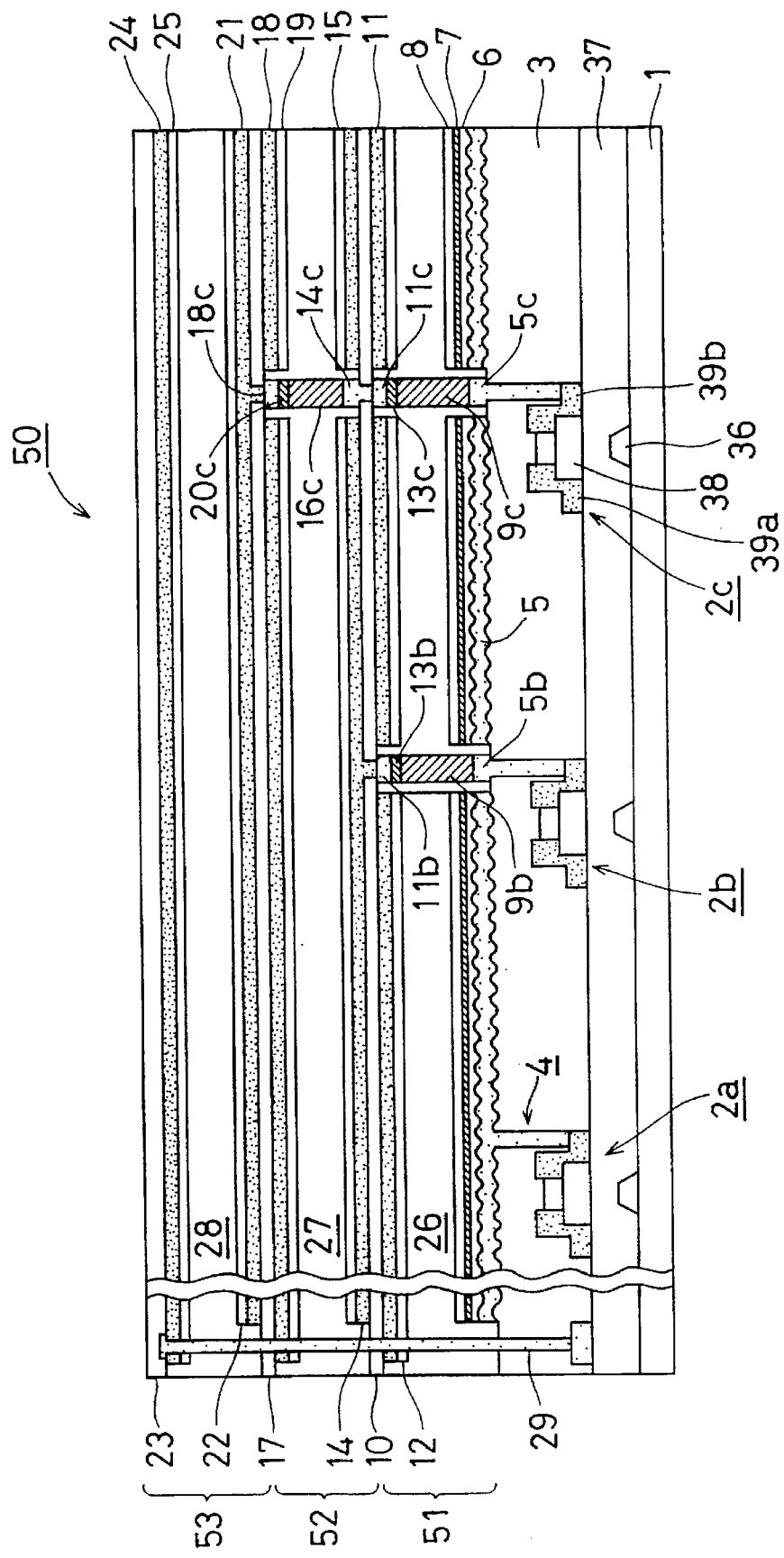
FIG. 1 is a schematic sectional view illustrating the major portion of a reflective liquid crystal display device which is one exemplary full-color liquid crystal display device according to the present invention.

The full-color liquid crystal display device of the present invention is constructed such that the plurality of liquid crystal driving active elements are formed on the first substrate and the three liquid crystal cells are formed above the liquid crystal driving active elements respectively connected to the liquid crystal cells. Therefore, the respective liquid crystal cells can independently be driven by the corresponding liquid crystal driving active elements.

Where the full-color liquid crystal display device is constructed as a reflective liquid crystal display device, a substrate to be used as the first substrate is not particularly limited, but examples thereof include known opaque and transparent insulating substrates such as of glass, quartz and plastic. Where the full-color liquid crystal display device is constructed as a transmissive liquid crystal display device, a transparent insulating substrate is preferably used as the first substrate. As described above, the first substrate has the plurality of liquid crystal driving active elements formed thereon. The liquid crystal driving active elements to be used are not particularly limited, but examples thereof include thin film transistors and MIM (metal insulator metal) devices. The size of the active elements may be appropriately controlled depending on the size of a liquid crystal display device to be fabricated. The first substrate formed with the liquid crystal driving active elements are covered with the inter-layer film. The inter-layer film can be formed of $SiO_2$, SiN or a specific resin. In the case of the reflective liquid crystal display device, the inter-layer film preferably has an undulation formed on a surface thereof with a level difference within a range between about 0.5 μm and about 1 μm.

An exemplary method for providing undulation to the inter-layer film is described in Japanese Unexamined Patent Publication No. Hei 6(1994)-75238. According to this method, a photosensitive acryl resin is applied on the substrate, and dots which are thereafter formed into projections are formed thereon by photolithographic and etching processes. Then, edge portions of a dot pattern thus obtained are rounded by a heat treatment, and a photosensitive acryl resin film is formed on the dot pattern to fill up flat portions of the dot pattern for formation of an underlay film. In turn, a metal film such as of aluminum or silver is formed on the underlay film for formation of a reflective electrode. By appropriately controlling the configuration of the undulation, the reflection characteristics of the reflective electrode can be optimized. The formation of the undulation can be achieved with a high reproduction accuracy because the photolithographic process is used.

The first, second and third liquid crystal cells are stacked one on another on the first substrate. The liquid crystal cells each have a pair of substrates respectively formed with a liquid crystal driving electrode and a transparent electrode as an counter electrode, and a liquid crystal layer sandwiched between the substrates. Since the liquid crystal cells are stacked one on another, the first liquid crystal cell shares one substrate (second substrate) of the second liquid crystal cell, and the second liquid crystal cell shares one substrate (third substrate) of the third liquid crystal cell.

Transparent insulating substrates such as described above may be used as the second, third and fourth substrates. The thickness of each of the substrates is not particularly limited as long as the substrate has a sufficient strength to withstand processes for forming the liquid crystal driving electrode and the transparent electrode on upper and lower surfaces thereof, but the thickness is preferably about 100 µm to about 300 µm.

The first liquid crystal driving electrode of the first liquid crystal cell is formed on the inter-layer film formed on the first substrate. In the case of the reflective liquid crystal display device, the first liquid crystal driving electrode is preferably formed of a conductive material serving as a reflector. Examples of specific conductive materials include aluminum, silver and titanium. The thickness of the first liquid crystal driving electrode is preferably about 50 nm to about 500 nm, more preferably about 100 nm to about 300 nm. The second and third liquid crystal driving electrodes of the second and third liquid crystal cells are formed directly on the second and third substrates, respectively. The second and third liquid crystal driving electrodes are each formed of a conductive transparent thin film :such as of $InO_3$, $SnO_2$ or ITO (indium tin oxide) having a thickness of about 50 nm to about 500 nm, preferably about 100 nm to about 300 nm. The first liquid crystal driving electrode of the reflective liquid crystal display device may be formed of a conductive transparent thin film, but a reflector of the aforesaid conductive material should be provided between the first substrate and the first liquid crystal driving electrode or between the first liquid crystal driving electrode and the first liquid crystal layer separately from the first liquid crystal driving electrode. In the case of the transmissive liquid crystal display device, the first liquid crystal driving electrode is preferably formed of the same material as that for the second and third liquid crystal driving electrodes.

The first, second and third counter electrodes are disposed parallel to the respective liquid crystal driving electrodes and the surfaces of the respective substrates. The first, second and third counter electrodes are preferably each formed of the aforesaid conductive transparent thin film having a thickness of about 50 nm to about 500 nm, more preferably about 100 nm to about 300 nm.

The first, second and third liquid crystal layers respectively comprise liquid crystal compositions containing different dyes (typically, magenta, cyan and yellow dyes) such as azo dyes, anthraquinone dyes, tetrazine dyes and coumarin dyes. A cell :spacing (or the thickness of each of the liquid crystal layers) is preferably about 4 µm to about 20 µm, which is defined by spacers held between the substrates of each of the liquid crystal cells. The respective liquid crystal compositions of the liquid crystal layers may contain the same or different liquid crystal materials, but contains different dyes. Examples of specific liquid crystal materials include nematic liquid crystals such as of Schiff base-type, azo-type, azoxy-type, benzoate-type, biphenyl-type, terphenyl-type, cyclohexyl carbonate-type, phenylcyclohexane-type, pyrimidine-type and dioxane-type and mixtures thereof, ferroelectric liquid crystals such as obtained by incorporating a chiral dopant in a phenylpyrimidine-type smectic liquid crystal, and polymer dispersion liquid crystals such as PDLC and NCAP. A chiral dopant may be optionally added to the liquid crystal materials. The respective liquid crystal layers are formed by injecting the liquid crystal compositions in the respective liquid crystal cells by way of a vacuum injection method. Alternatively, the formation of the liquid crystal layers may be achieved by first applying the liquid crystal compositions on the respective substrates, then combining the substrates together and sealing peripheral portions and injection openings of the liquid crystal cells with a sealer such as of a UV-curing acryl resin or a thermosetting epoxy resin. By providing injection openings for the three liquid crystal layers on different peripheral sides of the liquid crystal cells, contamination of the liquid crystal compositions can be prevented.

In the full-color liquid crystal display device of the present invention, the first liquid crystal driving electrode of the first liquid crystal cell is directly connected only to the first liquid crystal driving active element. The interconnection therebetween is achieved by forming a plug in the inter-layer film using the same material as that for the first liquid crystal driving electrode.

The second liquid crystal driving electrode of the second liquid crystal cell is connected to the second liquid crystal driving active element via a lower stereo-interconnection. The lower stereo-interconnection comprises an upper electrode pad, a metal interconnection and a lower electrode pad connected only to the second liquid crystal driving active element. The lower stereo-interconnection extends through the first liquid crystal cell, but is isolated from the first liquid crystal driving electrode and the first counter electrode of the first liquid crystal cell. The lower electrode pad connected only to the second liquid crystal driving active element is formed of the same material as that for the first liquid crystal driving electrode in a process for formation of the first liquid crystal driving electrode. The metal interconnection is formed of a conductive film having a desired thickness, for example, a thickness equal to or slightly greater than the cell spacing, typically about 4 µm to about 20 µm. The upper electrode pad connected to the second liquid crystal driving electrode is formed of the same material as that for the first counter electrode in a process for formation of the first counter electrode. This electrode pad may be of a single-layer structure formed of the same material as that for the first counter electrode or, alternatively, may be of a multilayer lamination structure formed of the same or different conductive materials. To prevent reduction in the aperture ratio of each pixel of the liquid crystal display device, the lower stereo-interconnection is preferably located in a region where pixels are not to be formed, for example, under a shading black matrix located between pixels.

The third liquid crystal driving electrode of the third liquid crystal cell is connected to the third liquid crystal driving active element via a second lower stereo-interconnection extending through the first liquid cell and having substantially the same construction as the aforesaid lower stereo-interconnection and via an upper stereo-interconnection extending through the second liquid crystal cell. In this case, the second lower stereo-interconnection and the upper stereo-interconnection are isolated from the first liquid crystal driving electrode and the first counter electrode of the first liquid crystal cell and from the second liquid crystal driving electrode and the second counter electrode of the second liquid crystal cell.

Stereo-interconnections each comprising electrode pads and an anisotropic conductive member may be used instead of the aforesaid stereo-interconnections each having the electrode pads and the metal interconnection of the conductive film. In this case, the electrode pads are preferably each formed in a such thickness that the spacing between the electrode pads is equivalent to the cell spacing whether the electrode pads are of a single-layer structure or of a multilayer structure. The anisotropic conductive member is preferably a generally spherical member having a core material and a conductive material layer and an insulating material layer formed around the core material, or having a conductive core material and an insulating material layer formed around the core material. More specifically, the anisotropic conductive member can be prepared by coating an insulating core material of a plastic ball such as of a phenol resin with a conductive material layer such as of aluminum, nickel, silver, tin, gold or zinc having a thickness of about 0.1 µm to about 0.5 µm and further with an insulating material layer such as of a polyamide resin or polymethacrylate. Alternatively, the anisotropic conductive member may be prepared by coating a conductive core material such as of aluminum, nickel, silver, tin, gold or zinc with an insulating material layer such as of a polyamide resin or polymethacrylate. The outer diameter of the conductive core material or the conductive material layer is preferably equivalent to the cell spacing, typically about 4 µm to about 6 µm. The anisotropic conductive member is pressed between the electrode pads or the substrates by applying a pressure of about 50 kg/cm$^2$ to about 80 kg/cm$^2$ (about 10 to about 20 g/bump for each anisotropic conductive member) at a temperature of about 90° C. to about 150° C. At this time, the outer insulating material layer is deformed and fluidized, and the inside conductive core material or the conductive material layer is exposed to be electrically connected to the electrode pads.

In the full-color liquid crystal display device, a protective insulating film and/or an orientation film may be optionally formed on either or both of the liquid crystal driving electrode and the counter electrode of each of the liquid crystal cells. The protective insulating film is formed of an inorganic thin film such as of $SiO_2$, SiN or $Al_2O_3$, or an organic thin film such as of polyimide, a photoresist resin or a polymer liquid crystal. The formation of an inorganic protective insulating film can be achieved by evaporation, sputtering, CVD, solution-coating or the like. For the formation of an organic protective insulating film, a solution or precursor solution of the aforesaid specific organic substance is applied by spin-coating, dip-coating, screen-printing, roll-coating or the like, and cured under predetermined curing conditions (by heating, irradiation and the like). Alternatively, the formation of the organic protective insulating film may be achieved by evaporation, sputtering, CVD, LB (Langumuir-Blodgett) method or the like. The orientation film is formed of an inorganic substance or an organic substance. The inorganic orientation film is formed of silicon oxide or the like by oblique evaporation or rotary evaporation. The organic orientation film is formed of an organic film such as of nylon, polyvinyl alcohol or polyimide subjected to an orientation treatment. The orientation may be imparted by using a polymer liquid crystal, an LB film, a magnetic field and a spacer edge method. Exemplary orientation treatment methods include a rubbing method and an oblique evaporation. Typical rubbing methods include a parallel rubbing method (in which a pair of substrates each formed with an orientation film subjected to a rubbing treatment are combined together in such a manner that the rubbing directions on the substrates coincide with each other), an antiparallel rubbing method (in which a pair of substrates each formed with an orientation film subjected to a rubbing treatment are combined together in such a manner that the rubbing directions on the substrates are opposite to each other), and a one-side rubbing method (an orientation film formed on one of a pair of substrates is subjected to a rubbing treatment).

In the case of the reflective liquid crystal display device, a ¼-wave plate is preferably disposed between the first liquid crystal driving electrode and the first liquid crystal layer. Usable as the wave plate are oblique-evaporated films such as of $TiO_2$, uniaxially-oriented films such as of polycarbonate and polyvinyl alcohol and polymer liquid crystal films such as of TN, STN and cholesteric liquid crystals. The thickness of the wave plate is not particularly limited, but may be appropriately controlled depending on the material and orientation state of the film to be used.

In the case of the transmissive liquid crystal display device, a polarizer and a back light are preferably disposed on an opposite face of the first substrate to the liquid crystal cells. It is more preferred that a pair of polarizers are disposed on upper and lower sides of the liquid crystal cells with the polarizing axes thereof being generally perpendicular to each other. The formation of the polarizer can be achieved, for example, by sandwiching an oriented film of PVA (polyvinyl alcohol)-iodine type or PVA-dye type between protective films of triacetyl cellulose (TAC).

In step (i) of the process for fabricating a full-color liquid crystal display device according to the present invention, a plurality of liquid crystal driving active elements are first formed on a first substrate. Where thin film transistors are to be formed as the liquid crystal driving active elements, for example, the following known method is employed. After gate electrodes are formed on the first substrate, an active layer is formed thereon with intervention of a gate insulating film, and then source/drain regions are formed in the active layer. In turn, source/drain electrodes are formed in the corresponding source/drain regions. An inter-layer film is formed on the entire surface of the first substrate including the liquid crystal driving active elements. Where the inter-layer insulating film is formed of $SiO_2$, for example, a known CVD or evaporation method is employed for the formation thereof. Contact holes extending to the liquid crystal driving active elements and each having a diameter of about 3 µm to about 30 µm are formed in the inter-layer film in a known manner, for example, by photolithographic and etching processes.

In step (ii), a material for a first liquid crystal driving electrode is deposited on the inter-layer film including the contact holes, for example, by sputtering or evaporation, and patterned into a desired configuration by photolithographic and etching processes to form the first liquid crystal driving electrode connected to a first liquid crystal driving active element and electrode pads respectively connected to second and third liquid crystal driving active elements. At this time, the patterning is performed in such a manner that these electrode pads are isolated from the first liquid crystal driving electrode. Thereafter, an insulating film, a protective film and an orientation film may optionally be formed on the first liquid crystal driving electrode. In such a case, it is required to remove portions of the insulating film and the like on the electrode pads by etching. Where the orientation film is formed, the orientation treatment is preferably performed in the aforesaid manner. In turn, lower stereo-interconnection layers to be respectively connected to the electrode pads are formed. Metal interconnections or anisotropic conductive members are employed as the lower stereo-interconnection layers. Where the metal interconnections are to be employed, a conductive film having a desired thickness is formed in a known manner, and patterned into a desired configuration by photolithographic and etching processes to form the metal interconnections only on the electrode pads.

In step (iii), a first counter electrode and electrode pads are formed on one surface (a lower surface) of a second substrate. A protective film and an orientation film may optionally be formed on the first counter electrode. In such a case, it is required to remove portions of the protective film and the like on the electrode pads in the same manner as in step (ii). On each of the electrode pads, another electrode pad may optionally be formed of the same or different material. The second substrate thus obtained is bonded onto the first substrate obtained in the previous step. The bonding of the substrates is preferably carried out after a bond-sealer is applied on a peripheral portion of the lower surface of the second substrate by a transfer process.

In step (iv), through-holes are formed in the bonded second substrate by photolithographic and etching processes, which through-holes extend from the other surface (an upper surface) thereof to the electrode pads previously formed on the lower surface thereof. Then, a material for a second liquid crystal driving electrode is deposited on the second substrate including the through-holes to form the second liquid crystal driving electrode to be connected to one of the lower stereo-interconnection layers via the corresponding electrode pad. At this time, still another electrode pad and an upper stereo-interconnection layer are formed in substantially the same manner as in step (ii). A protective film, an orientation film and the like may optionally be formed on the second liquid crystal driving electrode.

In steps (v), (vi) and (vii), a second liquid crystal cell and a third liquid crystal cell are formed in substantially the same manner as in step (iii) and (iv).

In step (viii), liquid crystal compositions are injected into the first, second and third liquid crystal cells by a vacuum injection method to form first, second and third liquid crystal layers, respectively.

The full-color liquid crystal display device and the fabrication process therefor according to the present invention will hereinafter be described by way of embodiments thereof. It should be noted that the embodiments are not limitative of the present invention.

Embodiment 1

FIG. 1 is a sectional view illustrating one pixel of a reflective full-color liquid crystal display device 50 of three-layer structure.

The liquid crystal display device 50 is constructed as follows. The liquid crystal display device 50 has first, second and third liquid crystal driving active elements 2a, 2b and 2c such as of thin film transistors formed on a first glass substrate 1 in correspondence to liquid crystal driving electrodes for driving respective liquid crystal layers (which will be described later). The active elements 2a, 2b and 2c each have a gate electrode 36 formed on the first substrate, an active layer 38 formed thereon with intervention of a gate insulating film 37, and source/drain electrodes 39a and 39b formed on opposite sides of the active layer 38. An inter-layer film 3 is formed on the entire surface of the first substrate 1 including the active elements 2a, 2b and 2c, and first, second and third liquid crystal cells 51, 52 and 53 are stacked thereon one on another.

In the first liquid crystal cell 51, a first liquid crystal driving electrode 5 and electrode pads 5b and 5c are formed on the inter-layer film 3. The first liquid crystal driving electrode 5 is connected to the first liquid crystal driving active element 2a and serves as a reflector. The electrode pads 5b and 5c are connected to the second and third liquid crystal driving active elements 2b and 2c, respectively. Further, an insulating film 6, a ¼-wave plate 7 and a transparent orientation film 8 are sequentially formed on the first liquid crystal driving electrode 5. A second substrate 10 formed with a transparent orientation film 12, a first counter electrode 11 and electrode pads 11b, 11c, 13b and 13c is disposed above the first liquid crystal driving electrode 5 with spacers (not shown) interposed between the transparent orientation films 8 and 12. A liquid crystal composition is filled between the transparent orientation films 8 and 12 to form a first liquid crystal layer 26. The electrode pads 5b and 5c are connected to the electrode pads 11b and 11c via a metal interconnection 9b and the electrode pad 11b and via a metal interconnection 9c and the electrode pad 11c, respectively.

In the second liquid crystal cell 52, a second liquid crystal driving electrode 14 and an electrode pad 14c are formed on an opposite side of the second substrate 10 to the first liquid crystal layer 26. The second liquid crystal driving electrode 14 is connected to the second liquid crystal driving active element 2b via the electrode pads 11b and 13b, the metal interconnection 9b and the electrode pad 5b. The electrode pad 14c is connected to the third liquid crystal driving active element 3b via the electrode pads 11c and 13c, the metal interconnection 9c and the electrode pad 5c. A transparent orientation film 15 is formed on the second liquid crystal driving electrode 14. A third substrate 17 formed with a transparent orientation film 19, a second counter electrode 18 and electrode pads 18c and 20c is disposed above the second substrate 10 formed with the second liquid crystal driving electrode 14 and the transparent orientation film 15 with spacers (not shown) interposed between the transparent orientation films 15 and 19. A liquid crystal composition is filled between the transparent orientation films 15 and 19 to form a second liquid crystal layer 27. The electrode pad 14c is connected to the electrode pad 18c via a metal connection 16c and the electrode pad 20c.

In the third liquid crystal cell 53, a third liquid crystal driving electrode 21 is formed on an opposite side of the third substrate 17 to the second liquid crystal layer 27. The third liquid crystal driving electrode 21 is connected to the third liquid crystal driving active element 2c via the electrode pads 18c and 20c, the metal interconnection 16c, the electrode pads 14c, 11c and 13c, the metal interconnection 9c and the electrode pad 5c. A transparent orientation film 22 is formed on the third liquid crystal driving electrode 21. A fourth substrate 23 formed with a transparent orientation film 25 and a third counter electrode 24 is disposed above the third substrate 17 formed with the third liquid crystal driving electrode 21 and the transparent orientation film 22 with spacers (not shown) interposed between the transparent orientation films 22 and 25. A liquid crystal composition is filled between the transparent orientation films 22 and 25 to form a third liquid crystal layer 28.

The first, second and third counter electrodes 11, 18 and 24 are interconnected by a common interconnection 29. The electrode pads 5b and 5c are electrically isolated from the first liquid crystal driving electrode 5. The electrode pads 11b, 11c, 13b and 13c are electrically isolated from the first counter electrode 11. The electrode pad 14c is electrically isolated from the second liquid crystal driving electrode 14. The electrode pads 18c and 20c are electrically isolated from the second counter electrode 18.

The aforesaid liquid crystal display device 50 is fabricated in the following manner.

Figure 2:
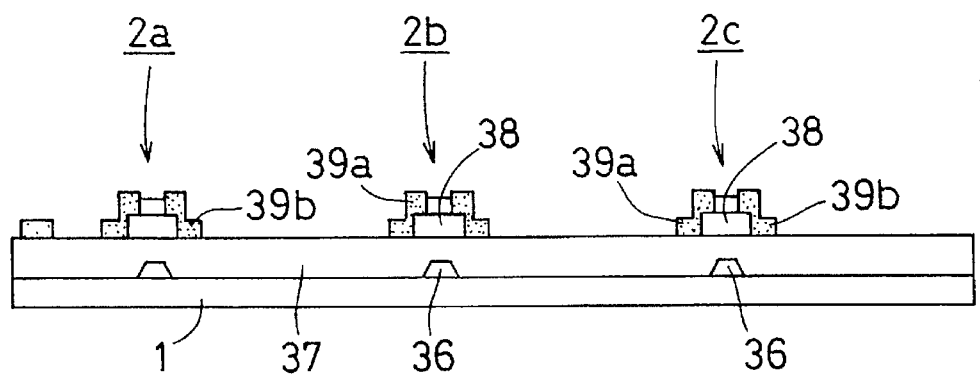
FIGS. 2 to 8 are schematic sectional views illustrating respective steps of a fabrication process for the reflective liquid crystal display device of FIG. 1.

As shown in FIG. 2, the gate electrodes 36, the gate insulating films 37, the active layers 38 are sequentially formed on the first glass substrate 1. The source/drain regions are formed in the active layers 38 and, in turn, the source/drain electrodes 39a and 39b are formed in the source/drain regions to form the first, second and third liquid crystal driving active elements 2a, 2b and 2c corresponding to the respective liquid crystal layers for each pixel of the liquid crystal display device 50. Then, gate interconnections and source interconnections (not shown) are formed.

Figure 3:
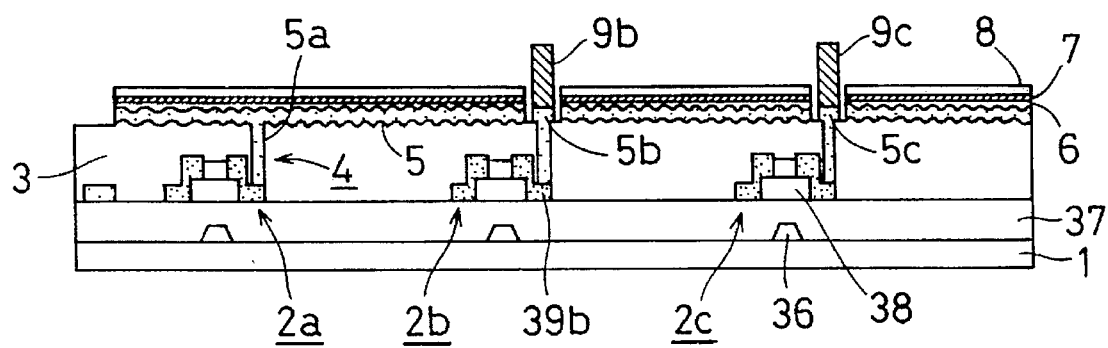

As shown in FIG. 3, these active elements 2a, 2b and 2c are covered with the inter-layer film 3 such as of SiO$_2$, and the undulation is formed on the surface of the inter-layer film 3. Then, the contact holes 4 are formed in the inter-layer film 3 on the respective drain electrodes 39b of the active elements 2a, 2b and 2c by photolithographic and etching processes. In turn, an Al film is formed on the entire surface of the inter-layer film 3 including the contact holes 4, and patterned into a desired configuration to form the first liquid crystal driving electrode 5 and the electrode pads 5b and 5c electrically isolated from the first liquid crystal driving electrode 5. The first liquid crystal driving electrode 5 is connected to the drain electrode 39b of the first active element 2a for driving the first liquid crystal layer 26. The electrode pads 5b and 5c are connected to the second and third active elements 2b and 2c for driving the second and third liquid crystal layers 27 and 28, respectively. The first liquid crystal driving electrode 5 also serves as a reflector. It should be noted that the electrode pads 5b and 5c are depicted as located in the pixel for convenience of explanation, but these electrode pads are preferably located under shading black matrix located between pixels. This makes it possible to form the stereo-interconnections without reducing the aperture ratio of the display.

To insulate the first liquid crystal layer 26 from the first liquid crystal driving electrode 5, the insulating film 6 of polyimide which is transparent in the visible range of spectrum, the ¼-wave plate 7 and the transparent orientation film 8 of polyimide also serving as an insulating film are successively formed on the entire surface of the first liquid crystal driving electrode 5. The transparent orientation film 8 is subjected to an orientation treatment by rubbing. The orientation treatment is performed to ensure homogeneous alignment of liquid crystal molecules.

In turn, portions of the insulating film 6, the ¼-wave plate 7 and the transparent orientation film 8 are removed by photolithographic and etching processes to form openings on the electrode pads 5b and 5c. A metal film such as of Al having a thickness equivalent to the cell spacing (4 μm to 20 μm) is formed on the entire surface of the transparent orientation film 8 including the openings, and then patterned by photolithographic and etching processes to form the metal interconnections 9b and 9c for stereo-interconnection only on the electrode pads 5b and 5c. Thereafter, spacers (not shown) for defining the cell spacing are scattered on the entire surface of the transparent orientation film 8.

Figure 4:
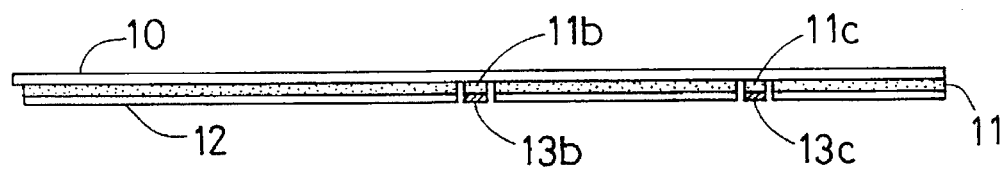

As shown in FIG. 4, an ITO film is formed on a lower surface of the second plastic substrate 10, and patterned into a desired configuration to form the first counter electrode 11 and the electrode pads 11b and 11c electrically isolated from the first counter electrode 11. In turn, the transparent orientation film 12 is formed on the entire surface of the second substrate 10 including the first counter electrode 11 and the electrode pads 11b and 11c. Then, portions of the transparent orientation film 12 are removed by photolithographic and etching processes to form openings on the electrode pads 11b and 11c. A metal film such as of Al is formed on the entire surface of the transparent orientation film 12 including the openings, and patterned by photolithographic and etching processes to form the electrode pads 13b and 13c for stereo-interconnection only on the electrode pads 11b and 11c. In turn, the transparent orientation film 12 formed on the lower surface of the second substrate 10 is subjected to a rubbing treatment, and a bond-sealer (not shown) is applied on a peripheral portion of the lower surface of the second substrate 10 by a transfer process.

Figure 5:
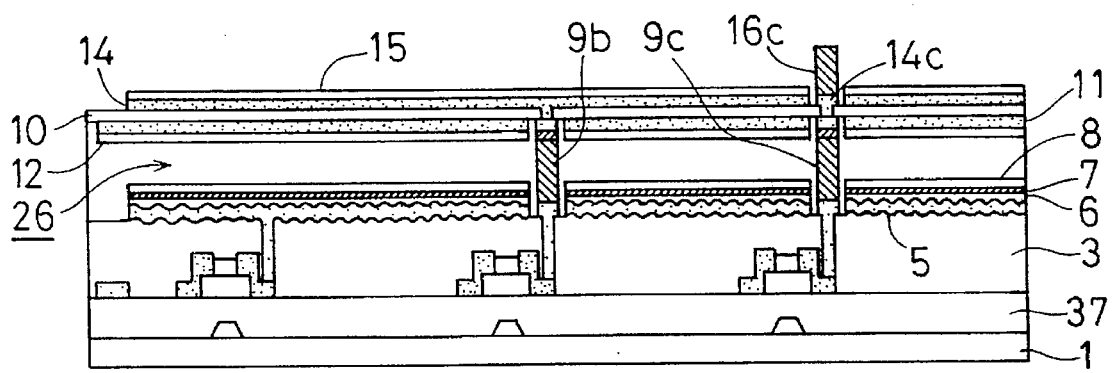

As shown in FIG. 5, the second substrate 10 obtained in the step shown in FIG. 4 is bonded to the first substrate obtained in the previous step in registration therewith to form a gap for the first liquid crystal layer 26. Thus, the metal interconnections 9b and 9c are connected to the electrode pads 13b and 13c, respectively.

In turn, through-holes extending from the upper surface of the second substrate 10 to the electrode pads 11b and 11c formed therebelow are formed in the second substrate 10 by photolithographic and etching processes. Then, an ITO film is formed on the entire surface of the second substrate 10 including the through-holes, and patterned into a desired configuration to form the second liquid crystal driving electrode 14 and the electrode pad 14c. Thereafter, a transparent orientation film 15 is formed on the entire surface of the second liquid crystal driving electrode 14, and subjected to an orientation treatment by rubbing. In turn, a portion of the transparent orientation film 15 is removed by photolithographic and etching processes to form an opening on the electrode pad 14c. Then, a metal film such as of Al having a thickness equivalent to the cell spacing (4 μm to 20 μm) is formed on the entire surface of the transparent orientation film 15 including the opening, and patterned by photolithographic and etching processes to form the metal interconnection 16c only on the-electrode pad 14c. Thereafter, spacers (not shown) for defining the cell spacing are scattered on the entire surface of the transparent orientation film 15.

Figure 6:
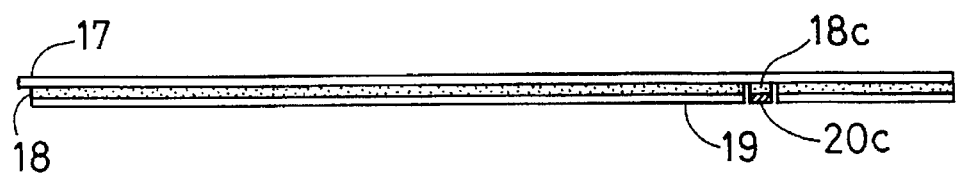

As shown in FIG. 6, the second counter electrode 18, the electrode pad 18c, the transparent orientation film 19 and the electrode pad 20c are formed on a lower surface of the third substrate 17 in substantially the same manner as in the step shown in FIG. 4. Then, the transparent orientation film 19 is subjected to a rubbing treatment, and a bond-sealer (not shown) is applied on a peripheral portion of the lower surface of the third substrate 17 by a transfer process.

Figure 7:
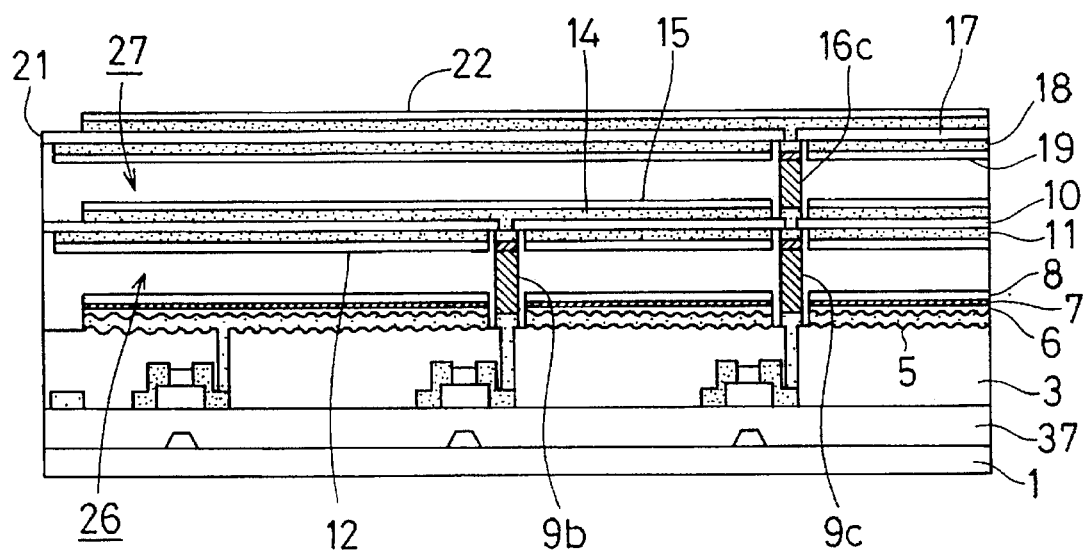

As shown in FIG. 7, the third substrate 17 obtained in the step shown in FIG. 6 is bonded to the second substrate 10 obtained in the previous step to form a gap for the second liquid crystal layer 27. Thus, the stereo-interconnection 16c is connected to the electrode pad 20c. Further, the third liquid crystal driving electrode 21 connected to the electrode pad 18c and the transparent orientation film 22 are formed on an upper surface of the third substrate 17 in substantially the same manner as in the step shown in FIG. 5, and the transparent orientation film 22 is subjected to a rubbing treatment. Then, spacers (not shown) are scattered on the entire surface of the transparent orientation film 15.

Figure 8:
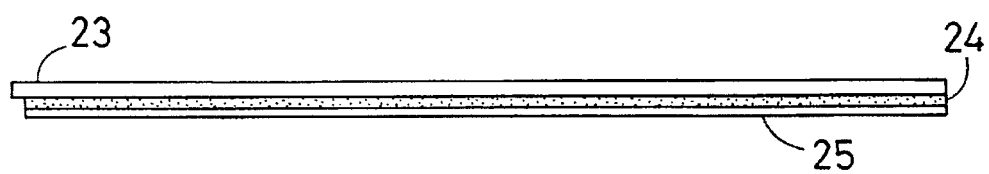

As shown in FIG. 8, the third counter electrode 24 and the transparent orientation film 25 are formed on a lower surface of the fourth substrate 23 in substantially the same manner as in the steps shown in FIGS. 4 and 6. Then, the transparent orientation film 25 is subjected to a rubbing treatment, and a bond-sealer (not shown) is applied on a peripheral portion of the lower surface of the fourth substrate 23 by a transfer process.

In turn, the fourth substrate 23 obtained in the step shown in FIG. 8 is bonded to the third substrate 17 obtained in the previous step to form a gap for the third liquid crystal layer 28. Thereafter, liquid crystal compositions each containing a desired dye are respectively injected into the three liquid crystal layers 26, 27 and 28. Finally, driver circuits for the first, second and third liquid crystal driving active elements 2a, 2b and 2c formed on the first substrate 10 are mounted, and the first, second and third counter electrodes 11, 18 and 24 are connected to the common interconnection 29. Thus, the full-color reflective liquid crystal display device 50 shown in FIG. 1 is completed.

There will next be explained a process for full-color display of the full-color reflective liquid crystal display device 50 in which the first, second and third liquid crystal layers 26, 27 and 28 comprise guest-host-type-liquid crystal compositions containing yellow, magenta and cyan dyes, respectively.

Figure 9:
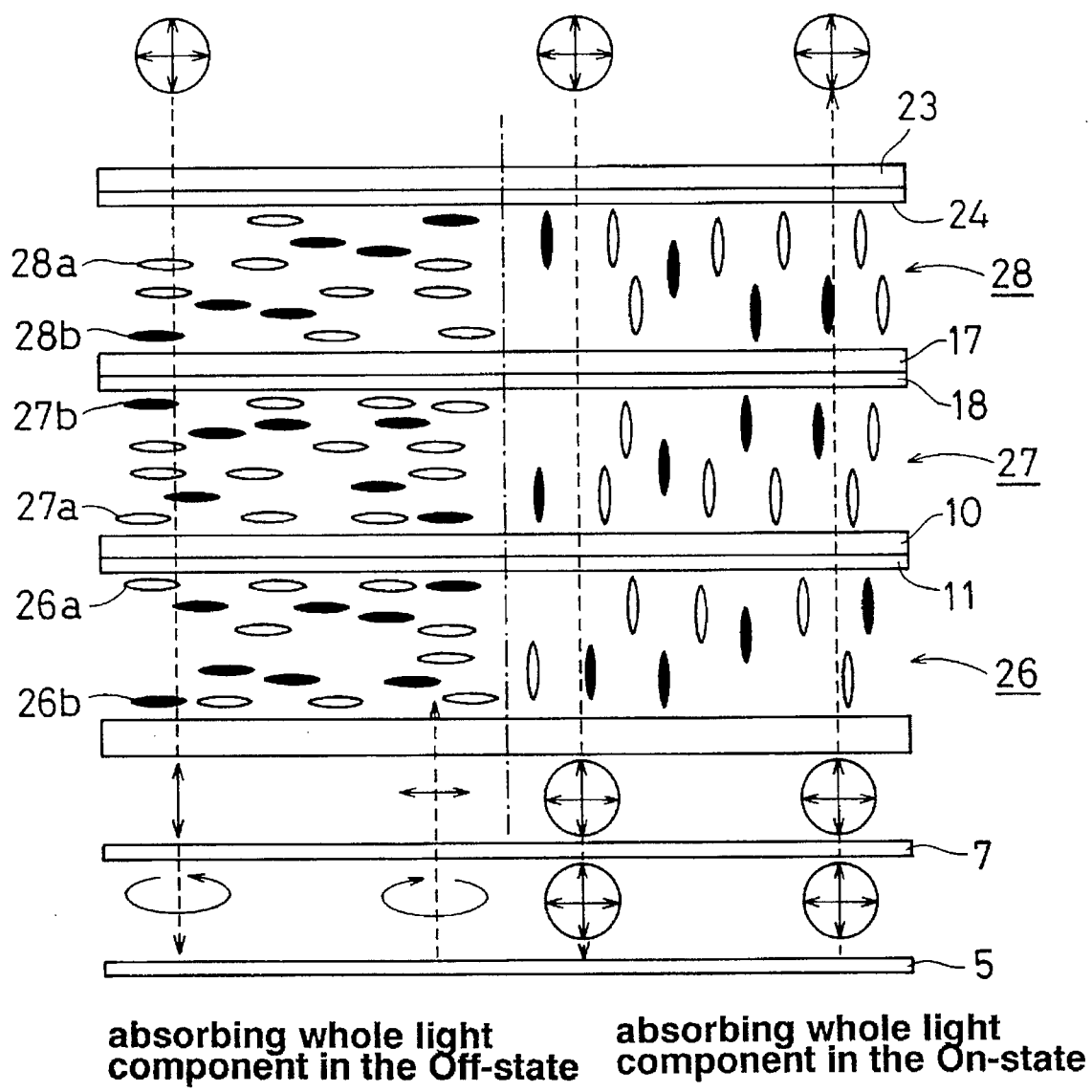
FIG. 9 is a diagram for explaining the relationship between incident light and reflected light in the reflective liquid crystal display device of FIG. 1.
Figure 10:
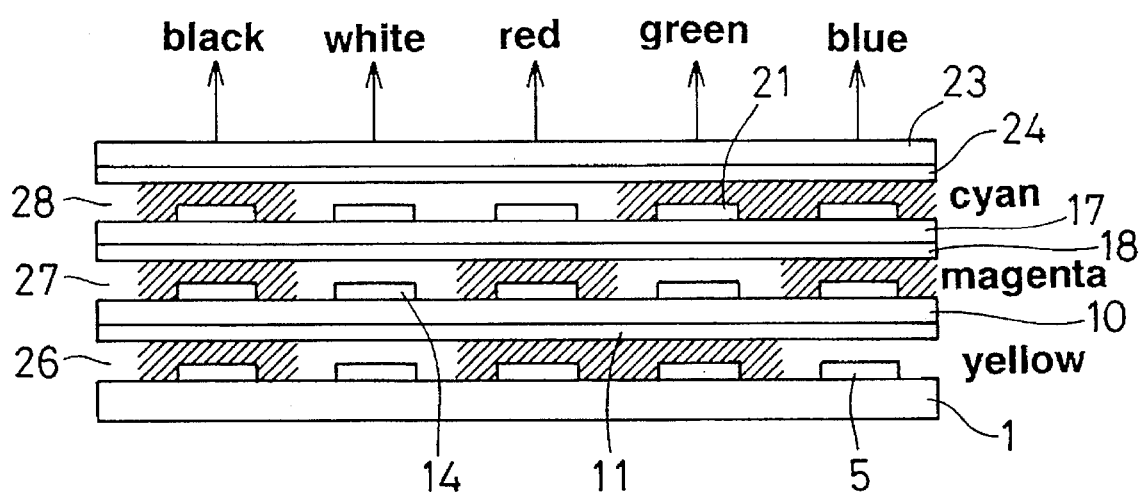
FIG. 10 is a diagram for explaining color display by way of the subtractive color process.

As shown in FIGS. 9 and 10, where all the three liquid crystal layer 28, 27 and 26 are in the OFF-state, a plane-polarized light component of natural light incident from the outside which vibrates in a direction coinciding with the alignment of molecules of respective dyes (cyan dye 28b, magenta dye 27b and yellow dye 26b) aligning in the same direction as liquid crystal molecules in the respective liquid crystal layers 28, 27 and 26 is absorbed by the respective dyes. Another plane-polarized light component of the natural light which vibrates in a direction perpendicular to the alignment of the molecules of the respective dyes passes sequentially through the liquid crystal layers 28, 27 and 26, and then enters the ¼-wave plate 7 so as to be converted into circularly-polarized light. When the circularly-polarized light component is reflected by the first liquid crystal driving electrode 5 serving as the reflector, the phase of the light component is shifted by n/2. When the reflected circularly-polarized light component again enters the ¼-wave plate 7, the light component is converted into a plane-polarized light component which vibrates in a direction perpendicular to the original polarization direction. Thus, the reflected light is absorbed by the dyes in the respective liquid crystal layers 26, 27 and 28, so that a black color is displayed. The provision of the ¼-wave plate 7 causes all the light components of the incident natural light to be absorbed by the dyes to display a solid black color.

Where all the three liquid crystal layers 28, 27 and 26 are in the ON-state, non of the light components of the incident natural light is absorbed by the dyes in the respective liquid crystal layers 28, 27 and 26. Therefore, all the light components pass through the ¼-wave plate 7 and then reflected by the first liquid crystal driving electrode 5. The reflected light again passes through the ¼-wave plate 7 and through the respective liquid crystal layers 26, 27 and 28 without being absorbed by the dyes contained therein. Thus, a white color is displayed.

As shown in FIG. 10, where red, green and blue colors are to be displayed, the respective liquid crystal layers 26, 27 and 28 are independently driven to control the absorption and transmission of light in the respective liquid crystal layers. When the red color (R) is to be displayed, only the liquid crystal layer 28 containing the cyan dye is put in the ON-state while the incident natural light is passed through the respective liquid crystal layers. Thus, a green light component (G) and a blue light component (B) of the incident light are absorbed by the liquid crystal layers 27 and 26 respectively containing the magenta and yellow dyes. The green and blue light components both in the incident light and in the reflected light are absorbed in substantially the same manner as in the display process for the black color. By virtue of the absorption of the green and blue light components of the incident natural light, only a red light component of the incident natural light is reflected outward. Thus, the red color can be displayed. Similarly, when the green color is to be displayed, only the liquid crystal layer 27 containing the magenta dye is put in the ON-state and the liquid crystal layers 28 and 26 respectively containing the cyan and yellow dyes are put in the OFF-state, so that the red and blue light components of the natural light are absorbed and only the green light component is reflected outward. Thus, the green color can be displayed. Further, when a blue color is to be displayed, only the liquid crystal layer 26 containing the yellow dye is put in the ON-state and the liquid crystal layers 28 and 27 respectively containing the cyan and magenta dyes are put in the OFF-state. Thus, the blue color can be displayed.

Embodiment 2

Figure 11:
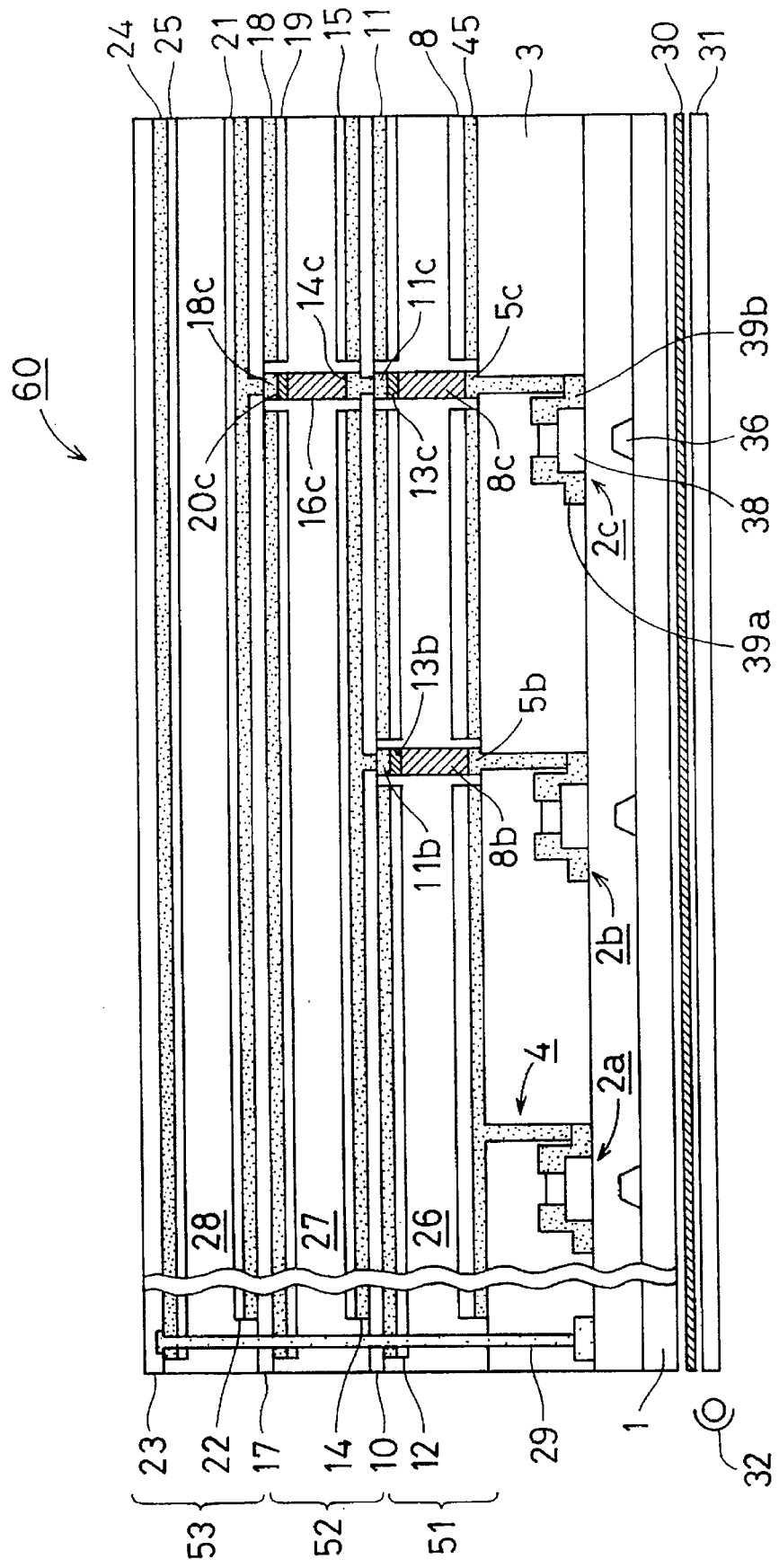
FIG. 11 is a schematic sectional view illustrating the major portion of an equalizing liquid crystal display device which is another exemplary full-color liquid crystal display device according to the present invention.

FIG. 11 is a sectional view illustrating one pixel of a full-color transmissive display device 60 of three-layer structure. The transmissive liquid crystal display device 60 has substantially the same construction as the reflective liquid crystal display device 50 shown in FIG. 1 except the following points.

The liquid crystal display device 60 dispenses with the provision of the insulating film 6 and the ¼-wave plate 7, and employs a transparent first liquid crystal driving electrode 45 instead of the first liquid crystal driving electrode 5 serving as the reflector. The liquid crystal display device 60 further includes a polarizer 30 and a light guiding plate 31 formed on an opposite side of the first substrate 10 to the side where a liquid crystal layer is formed, and a light source 32 for supplying light into the light guiding plate 31.

There will be described a process for full-color display of the full-color transmissive liquid crystal display device 60 shown in FIG. 11 in which the first, second and third liquid crystal layers 26, 27 and 28 comprise guest-host-type liquid crystal compositions containing yellow, magenta and cyan dyes, respectively.

Referring to FIG. 11, illumination delivered through the light guiding plate 31 enters the polarizer 30, and only a light component vibrating in a direction coinciding the polarization direction of the polarizer 30 is allowed to pass though the polarizer 30. The polarization direction coincides with the homogeneous alignment of liquid crystal molecules in the respective liquid crystal layers. Therefore, when all the liquid crystal layers are in the OFF-state, all the color light components of the polarized light are absorbed by the dyes contained in the respective liquid crystal layers. Thus, a black color is displayed. When all the liquid crystal layers are in the ON-state, the polarized light is not absorbed by the dyes in the respective liquid crystal layers, so that a white color is displayed. For the full-color display, the respective liquid crystal layers are independently driven in the same manner as in the aforesaid reflective liquid crystal display device.

Embodiment 3

Figure 12:
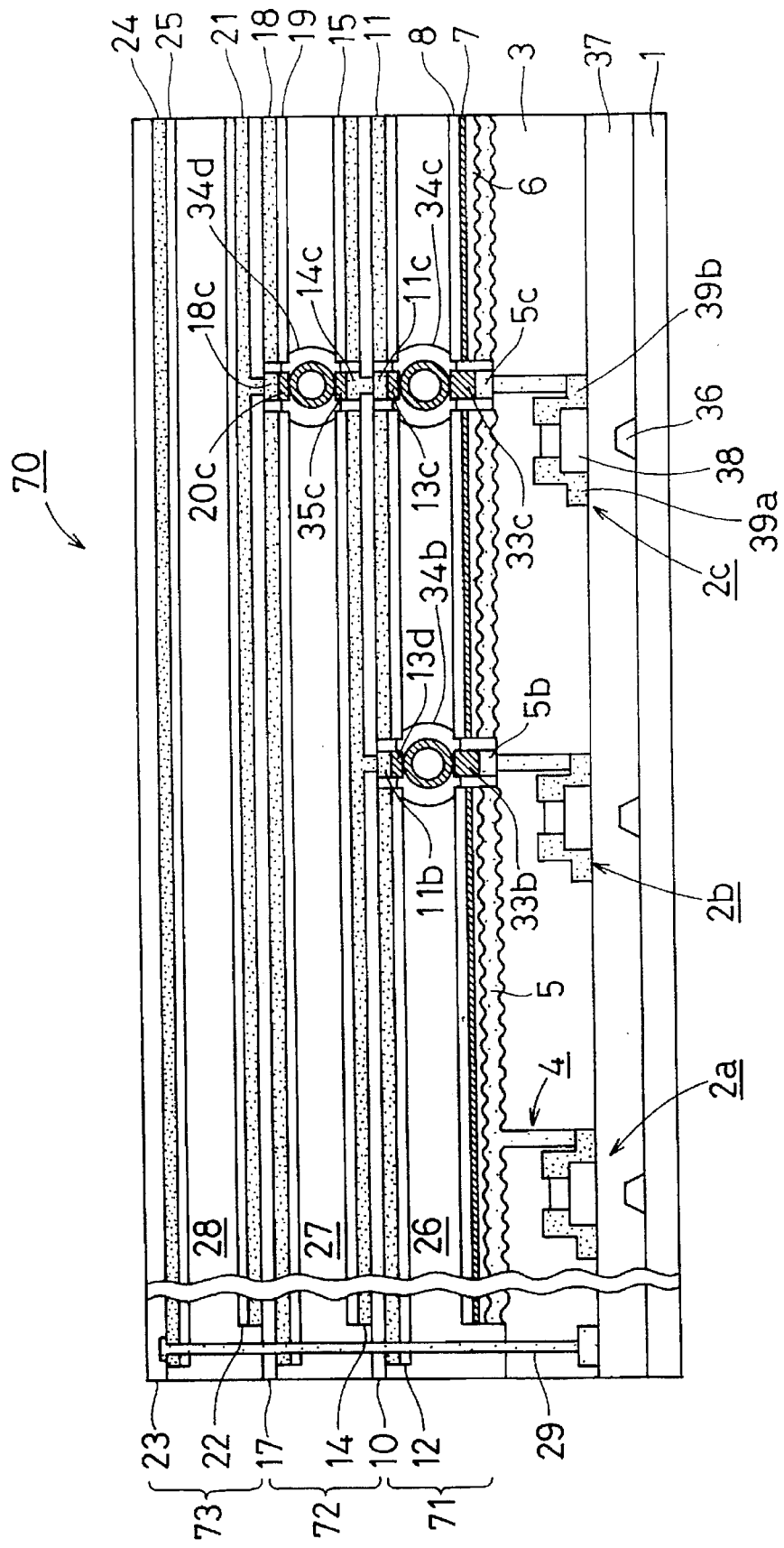
FIG. 12 is a schematic sectional view illustrating the major portion of a reflective liquid crystal display device which is still another exemplary full-color liquid crystal display device according to the present invention.

FIG. 12 is a sectional view illustrating one pixel of a full-color reflective liquid crystal display device 70 of three-layer structure employing anisotropic conductive members as stereo-interconnections.

The liquid crystal display device 70 employs anisotropic conductive members 34b, 34c and 34d instead of the metal interconnections 9b, 9c and 16c of the reflective liquid crystal display device shown in FIG. 1. The liquid crystal display device 70 further includes electrode pads 33b, 33c and 35c formed on electrodes pads 5b, 5c and 14c, respectively.

Figure 13:
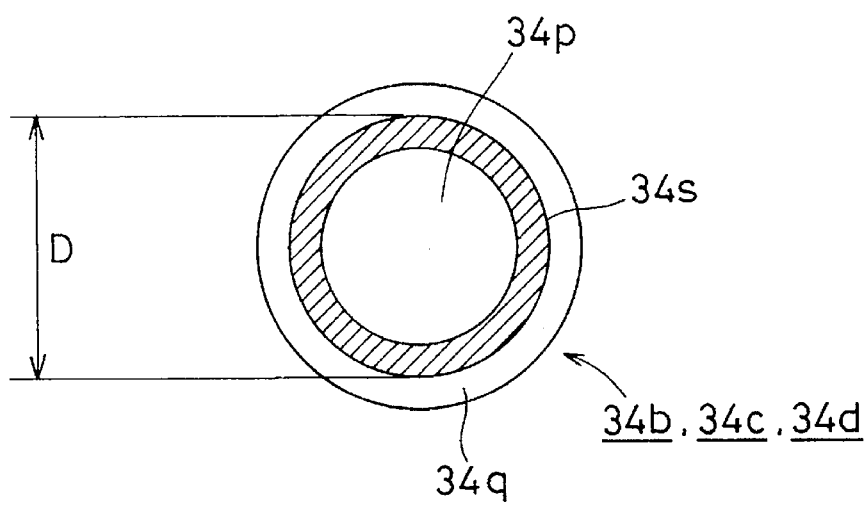
FIG. 13 is a schematic sectional view illustrating an anisotropic conductive member.

As shown in FIG. 13, the anisotropic conductive members 34b, 34c and 34d each have a spherical core material 34p coated with a conductive material 34s and further with an insulating material 34q. It should be noted that anisotropic conductive members having such a construction are also employed as spacers.

The liquid crystal display device 70 is fabricated in the following manner.

Gate electrodes 36, gate insulating films 37, active layers 38 and source/drain electrodes 39a and 39b are formed on a first substrate 1 in the same manner as for the reflective liquid crystal display device 50 in Embodiment 1 to form active elements 2a, 2b and 2c for driving respective liquid crystal layers in each pixel.

In the same manner as in Embodiment 1, an inter-layer film 3, a first liquid crystal driving electrode 5, electrode pads 5b and 5c, an insulating film 6, a ¼-wave plate 7 and a transparent orientation film 8 are successively formed on the first substrate thus obtained, and the transparent orientation film 8 is subjected to a rubbing treatment so as to be imparted with homogeneous orientation. Thereafter, portions of the insulating film 6, the ¼-wave plate 7 and the transparent orientation film 8 are removed by photolithographic and etching processes to form openings on the electrode pads 5b and 5c. In turn, a metal film such as of Al is formed on the entire surface of the transparent orientation film 8 including the openings, and patterned by photolithographic and etching processes to form electrode pads 33b and 33c for stereo-interconnections.

The anisotropic conductive members 34b, 34c serving as the spacers are interspersed on the first substrate thus obtained.

In the same manner as in Embodiment 1, a transparent first counter electrode 11 and electrode pads 11b and 11c, a transparent orientation film 12 and electrode pads 13b and 13c for stereo-interconnections are formed on a lower surface of a second substrate 10, and the transparent orientation film 12 is subjected to a rubbing treatment. Then, a bond-sealer (not shown) is applied on a peripheral portion of the lower surface of the second substrate 10 by a transfer process.

Figure 14:
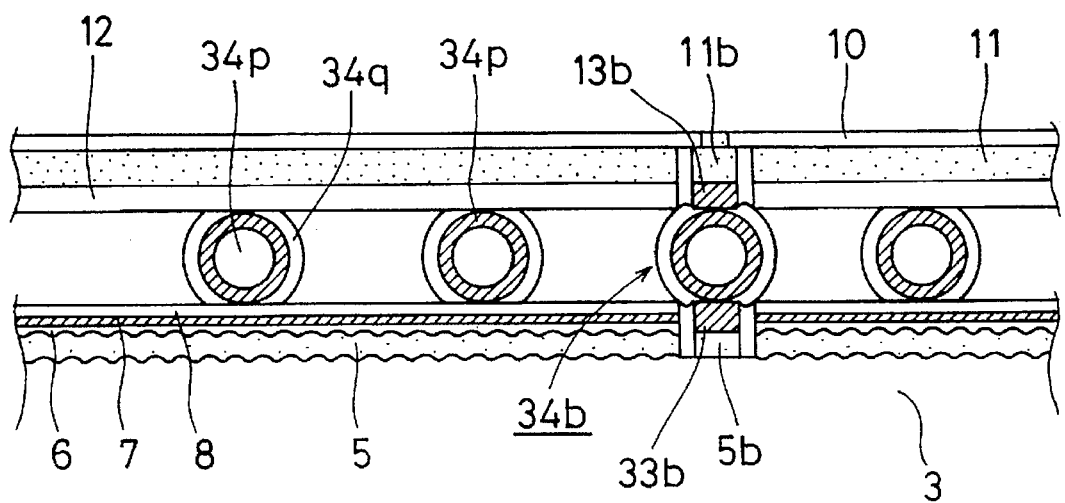
FIG. 14 is a schematic sectional view for explaining a fabrication process for the reflective liquid crystal display device of FIG. 12.

As shown in FIG. 14, the second substrate 10 is bonded to the first substrate 1 obtained in the previous step in registration therewith. At this time, the anisotropic conductive member 34b (34c) is pressed between the electrode pads 33b and 13b (33c and 13c) by applying a pressure of about 50 kg/cm² to about 80 kg/cm² at a temperature of about 90° C. to about 150° C. The insulating material 34q of the anisotropic conductive member 34b (34c) is fluidized, and the conductive material 34p is exposed to electrically connect the electrode pad 33b (33c) to the electrode pad 13b (13c). On the other hand, the anisotropic conductive members scattered on a region of the transparent orientation film 8 where the electrode pad 33b (33c) is not formed are held between the transparent orientation films 8 and 12 in a nonconductive state. As described above, these anisotropic conductive members serve as spacers to define a cell spacing (equivalent to a diameter D in FIG. 13).

In the same manner as in Embodiment 1, a second liquid crystal driving electrode 14, an electrode pad 14c and a transparent orientation film 15 are formed on an upper surface of the second substrate 10, and a portion of the transparent orientation film 15 is removed to form an opening only on the electrode pad 14c. Then, a metal film such as of Al is formed on the entire surface of the transparent orientation film 15 including the opening, and patterned to form an electrode pad 35c.

Thereafter, a gap for a second liquid crystal layer 27 is formed between the second substrate 10 and a third substrate 17 having a second counter electrode 18 formed on a lower surface thereof with the anisotropic conductive member 34d interposed therebetween in the aforesaid manner. Further, a gap for a third liquid crystal layer 28 is formed between the third substrate 17 and a fourth substrate 23 formed with a third counter electrode 24 in the same manner as in embodiment 1. Then, gaps for the first, second and third liquid crystal layers 26, 27 and 28 are respectively filled with desired liquid crystal compositions to form the first, second and third liquid crystal cells 71, 72 and 73. Finally, in the same manner as in Embodiment 1, driver circuits for the first, second and third liquid crystal driving active elements 2a, 2b and 2c are mounted on the first substrate 10, and the first, second and third counter electrodes 11, 18 and 24 are connected to a common interconnection 29. Thus, the full-color reflective liquid crystal display device 70 is completed.

The full-color reflective full-color liquid crystal display device 70 shown in FIG. 12 employs the same guest-host-type liquid crystal compositions as in Embodiment 1 for full-color display.

In accordance with the present invention, the full-color liquid crystal display device has the plurality of liquid crystal driving active elements formed on the first substrate and the three liquid crystal cells stacked thereon and respectively connected to the corresponding liquid crystal driving active elements. Since the stereo-interconnections interconnecting the respective liquid crystal driving electrodes and the corresponding liquid crystal driving active elements formed on the first substrate eliminate the need to provide a liquid crystal driving active element on each of the first, second and third substrates, thin and light-weight plastic substrates can be used. Therefore, the color offset of a displayed image can be prevented in the liquid crystal display device having the three liquid crystal cells stacked one on another.

Since the liquid crystal driving active elements are formed only on the first substrate, the driver circuits for driving the liquid crystal cells are mounted only on the first substrate. Therefore, expense in time and cost for mounting the driver circuits can be reduced to about one third in comparison with a case where the liquid crystal driving active elements are respectively formed on the first, second and third substrates.

Further, the respective liquid crystal layers are independently driven by the corresponding liquid crystal driving active elements. Therefore, multi-color display can be realized without dividing one pixel into three sub-elements, unlike the conventional full-color display technique utilizing a color filter system. Hence, the full-color liquid crystal display device can exhibit an increased resolution of an image, and theoretically offer a three-fold improvement in the use efficiency of light.

Where the liquid crystal layers of the liquid crystal cells respectively comprise liquid crystal compositions containing different dyes, full-color display can be realized without conventionally used color filters.

Where metal interconnections or anisotropic conductive members are used as the stereo-interconnections, an area to be occupied by the electrode interconnections in each pixel can be reduced, allowing the liquid crystal display device to have a higher aperture ratio.

The liquid crystal display device of the present invention can enjoy a higher use efficiency of light. Therefore, the liquid crystal display device can be used as a reflective liquid crystal display device by allowing the first liquid crystal driving electrode to serve as a reflector. Further, the interconnection between the liquid crystal driving active elements is provided below the first liquid crystal driving electrode serving as the reflector and, hence, reduction in the aperture ratio of each pixel can be prevented.

Further, the liquid crystal display device of the present invention can be used as a transmissive liquid crystal display device by providing a polarizer and a back light below the first substrate. Thus, a full-color transmissive liquid crystal display device can be provided which offers an improved use efficiency of light and a lower power consumption.

In the process for fabricating a full-color liquid crystal display device according to the present invention, the liquid crystal driving active elements are formed only on the first substrate. Therefore, complicated fabrication steps such as a step of forming a liquid crystal driving active element on a substrate of each liquid crystal cell and a step of forming a driver circuit for the liquid crystal cell can be dispensed with.

The respective liquid crystal driving active elements are formed only on the first substrate. Therefore, only the first substrate is inspected for the operation check and defect check of the active elements. This facilitates the product inspection and improves the yield of products.

What is claimed is:

1. A full-color liquid crystal display device comprising:

a plurality of liquid crystal driving active elements formed on a first substrate; and first, second and third liquid crystal cells stacked one on another on an inter-layer film formed on the first substrate;

the first liquid crystal cell including a first liquid crystal driving electrode connected to a first liquid crystal driving active element formed on the first substrate, a first counter electrode facing opposite the first liquid crystal driving electrode, a second substrate having the first counter electrode formed on an lower surface thereof, and a first liquid crystal layer sandwiched between the first liquid crystal driving electrode and the first counter electrode;

the second liquid crystal cell formed on the second substrate and including a second liquid crystal driving electrode connected to a second liquid crystal driving active element formed on the first substrate via a lower stereo-interconnection extending through the first liquid crystal cell, a second counter electrode facing opposite the second liquid crystal driving electrode, a third substrate having the second counter electrode formed on a lower surface thereof, and a second liquid crystal layer sandwiched between the second liquid crystal driving electrode and the second counter electrode;

the third liquid crystal cell formed on the third substrate and including a third liquid crystal driving electrode connected to a third liquid crystal driving active element formed on the first substrate via another lower stereo-interconnection extending through the first liquid crystal cell and an upper stereo-interconnection extending through the second liquid crystal cell, a third counter electrode facing opposite the third liquid crystal driving electrode, a fourth substrate having the third counter electrode formed on a lower surface thereof, and a third liquid crystal layer sandwiched between the third liquid crystal driving electrode and the third counter electrode.

2. A full-color liquid crystal display device as set forth in claim 1, wherein the first, second and third liquid crystal layers respectively comprise liquid crystal compositions containing different dyes.

3. A full-color liquid crystal display device as set forth in claim 1, wherein the upper and lower stereo-interconnections each include a metal interconnection or an anisotropic conductive member and an electrode pad.

4. A full-color liquid crystal display device as set forth in claim 1, wherein the first liquid crystal driving electrode is a reflective type electrode, the liquid crystal display device further comprising a ¼-wave plate provided between the first liquid crystal driving electrode and the first liquid crystal layer.

5. A full-color liquid crystal display device as set forth in claim 1, wherein the first, second and third liquid crystal driving electrodes are transparent electrodes, the liquid crystal display device further comprising a polarizer and a back light provided on an opposite side of the first substrate to the first liquid crystal cell.

6. A process for fabricating a full-color liquid crystal display device, comprising the steps of:

(i) forming a plurality of liquid crystal driving active elements on a first substrate, and forming an inter-layer film on the entire surface of the first substrate including the liquid crystal driving active elements, the inter-layer film having a plurality of contact holes extending therethrough to the liquid crystal driving active elements;

(ii) forming on the inter-layer film a first liquid crystal driving electrode connected to a first liquid crystal driving active element and electrode pads respectively connected to second and third liquid crystal driving active elements, and forming lower stereo-interconnection layers respectively connected to the electrode pads formed on the inter-layer film;

(iii) forming electrode pads and a first counter electrode on one surface of a second substrate, and bonding the second substrate to the first substrate in such a manner that the first counter electrode and the first liquid crystal driving electrode face opposite to each other to define a desired space therebetween;

(iv) forming on the other surface of the second substrate an electrode pad and a second liquid crystal driving electrode connected to one of the lower stereo-interconnection layers, and forming an upper stereo-interconnection layer connected to the electrode pad formed on the other surface of the second substrate;

(v) forming a second counter electrode and an electrode pad on one surface of a third substrate, and bonding the third substrate to the second substrate in such a manner that the second counter electrode and the second liquid crystal driving electrode face opposite to each other to define a desired space therebetween;

(vi) forming on the other surface of the third substrate a third liquid crystal driving electrode connected to the upper stereo-interconnection layer;

(vii) forming a third counter electrode on a surface of a fourth substrate, and bonding the fourth substrate to the third substrate in such a manner that the third counter electrode and the third liquid crystal driving electrode face opposite to each other to define a desired space therebetween; and (viii) filling liquid crystal compositions into the spaces defined between the first counter electrode and the first liquid crystal driving electrode, between the second counter electrode and the second liquid crystal driving electrode and between the third counter electrode and the third liquid crystal driving electrode to form first, second and third liquid crystal layers, respectively.

7. A process as set forth in claim 6, wherein the liquid crystal compositions of the first, second and third liquid crystal layers respectively contain different dyes.

8. A process as set forth in claim 6, wherein metal interconnections or anisotropic conductive members are formed as the upper and lower stereo-interconnection layers.

9. A process as set forth in claim 6, wherein the first liquid crystal driving electrode is formed of a reflective type electrode material in step (ii), the process further comprising the step of forming a ¼-wave plate on the first liquid crystal driving electrode.

10. A process as set forth in claim 6, wherein the first, second and third liquid crystal driving electrodes are formed of a transparent electrode material, the process further comprising the step of forming a polarizer and a back light on an opposite side of the first substrate to the first liquid crystal cell.

* * * * *